US009656545B2

(12) United States Patent
Dubey et al.

(10) Patent No.: US 9,656,545 B2
(45) Date of Patent: May 23, 2017

(54) TANDEM AXLE DISCONNECT WITH SYNCHRONIZED OVERDRIVE

(71) Applicant: Schaeffler Technologies GmbH & Co. KG, Herzogenaurach (DE)

(72) Inventors: Rohan Dubey, Sterling Heights, MI (US); Michael Claassen, Bruce Township, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 155 days.

(21) Appl. No.: 14/478,694

(22) Filed: Sep. 5, 2014

(65) Prior Publication Data

US 2015/0072826 A1   Mar. 12, 2015

Related U.S. Application Data

(60) Provisional application No. 61/875,993, filed on Sep. 10, 2013.

(51) Int. Cl.
| | | |
|---|---|---|
| B60K 17/36 | (2006.01) | |
| F16H 48/05 | (2012.01) | |
| F16H 48/00 | (2012.01) | |
| B60K 23/08 | (2006.01) | |

(52) U.S. Cl.
CPC ............ *B60K 17/36* (2013.01); *F16H 48/05* (2013.01); *B60K 23/08* (2013.01); *F16H 2048/02* (2013.01)

(58) Field of Classification Search
CPC .... B60K 2023/0816; B60K 2023/0833; B60K 2023/0841; B60K 2023/085
See application file for complete search history.

(56) References Cited

U.S. PATENT DOCUMENTS

| | | | |
|---|---|---|---|
| 4,050,534 A | 9/1977 | Nelson et al. | |
| 4,271,722 A | 6/1981 | Campbell | |
| 4,754,847 A | 7/1988 | Glaze et al. | |
| 5,113,986 A | 5/1992 | Frost | |
| 5,183,132 A * | 2/1993 | Fujisawa | B60K 17/35 180/247 |
| 5,711,389 A | 1/1998 | Schlosser | |
| 5,996,720 A | 12/1999 | Hunt | |
| 6,840,882 B2 | 1/2005 | Oates et al. | |
| 7,059,215 B1 | 6/2006 | Ziech | |
| 7,195,579 B2 | 3/2007 | Claussen et al. | |
| 2012/0204675 A1 | 8/2012 | Maerkl | |

* cited by examiner

*Primary Examiner* — Derek D Knight
*Assistant Examiner* — Timothy M Hannon
(74) *Attorney, Agent, or Firm* — Simpson & Simpson, PLLC

(57) ABSTRACT

A torque transfer assembly for a tandem axle drive train, having a first synchronizer assembly including a first portion arranged to non-rotatably connect to a power input shaft arranged to receive torque from an engine, a second synchronizer assembly, an overdrive gear assembly engageable with the first synchronizer assembly, and an inter-axle differential gear (IAD) arranged to engage first and second power shafts, and engaged with the second synchronizer assembly. In a differential mode, a first torque path is formed from the power input shaft to a first axle through the first synchronizer, the power shafts, the IAD and second synchronizer, and a second torque path is formed from the power input shaft to a second axle through the first synchronizer, the power shafts, and the IAD, and, in overdrive mode, a third torque path is formed from the power input shaft to the first axle through the first synchronizer.

18 Claims, 6 Drawing Sheets

TANDEM AXLE DISCONNECT WITH SYNCHRONIZED OVERDRIVE

CROSS-REFERENCE TO RELATED APPLICATIONS

This application claims the benefit of U.S. Provisional Patent Application No. 61/875,993, filed Sep. 10, 2013, which application is hereby incorporated by reference in its entirety.

TECHNICAL FIELD

The present disclosure relates generally to a torque transfer assembly for a tandem axle assembly. More specifically, the present disclosure relates to a torque transfer assembly with an overdrive mode for disconnecting the rear axle or axles in the tandem axle assembly to improve fuel efficiency.

BACKGROUND

Tandem axles are used in heavy load carrying vehicles such as trucks and busses. Tandem axles provide a means for transferring torque from the engine drive shaft to successive or tandem axles on the truck. Additionally, tandem axles distribute heavy loads over multiple axles to avoid excessive loads on a single axle. Tandem axles further provide improved traction for adverse road conditions. Inter axle differential mechanisms divide power from a single drive shaft to two separate axle assemblies. One such tandem axle assembly having an inter axle differential is disclosed in U.S. Pat. No. 4,754,847 (Glaze et al.). Another tandem axle assembly is disclosed in U.S. Pat. No. 4,050,534 (Nelson et al.). Typical tandem axle assemblies are not particularly fuel efficient.

U.S. Pat. No. 4,271,722 (Campbell) describes a differential for a four-wheel drive vehicle that includes an integral remotely operable disconnect. Conventional disconnect assemblies do not have overdrive systems and are also not particularly fuel efficient.

U.S. Pat. No. 5,711,389 (Schlosser) describes a tandem rear drive axle assembly that is capable of selectively driving either one or both axles without the use of an inter axle differential. The drive axle assembly includes an input shaft connected to a first axle. A clutch pack is used to selectively engage and disengage a second axle. A clutch actuator assembly is used to automatically actuate the clutch when driving of the second axle is desired.

SUMMARY

According to aspects illustrated herein, there is provided a torque transfer assembly for a tandem axle drive train having a first synchronizer assembly including a first portion arranged to non-rotatably connect to a power input shaft in the tandem axle drive train, the power input shaft arranged to receive torque from an engine in the tandem axle drive train, a second synchronizer assembly, an overdrive gear assembly, and, an inter-axle differential gear engaged with first and second power shafts and the second synchronizer assembly. In a differential mode for the torque transfer assembly, a first torque path is formed from the power input shaft to a first axle in the tandem axle drive train through the first synchronizer assembly, the first power shaft, the inter-axle differential gear, and the second power shaft, and, a second torque path is formed from the power input shaft to a second axle in the tandem axle drive train through the first synchronizer assembly, the first power shaft, the inter-axle differential gear, and the second synchronizer assembly. In an overdrive mode for the torque transfer assembly, a third torque path is formed from the power input shaft to the first axle through the first synchronizer assembly and the overdrive gear assembly.

Additionally, according to aspects illustrated herein, there is provided a torque transfer assembly for a tandem axle drive train having a first synchronizer assembly including a first portion arranged to non-rotatably connect to a power input shaft in the tandem axle drive train, the power input shaft arranged to receive torque from an engine in the tandem axle drive train, a second portion non-rotatably connect to a first power shaft, and, a third portion, a second synchronizer assembly including a fourth portion arranged to transmit torque to a first axle in the tandem axle drive train, a fifth portion non-rotatably connected to the fourth portion, and, a sixth portion, an overdrive gear assembly engaged with the third portion and arranged to non-rotatably connect to the first axle in the tandem axle drive train, and, an inter-axle differential gear including a first gear non-rotatably connect to the first power shaft, engaged with the sixth portion, and, engaged a second power shaft, the second power shaft arranged to transmit torque to a second axle for the tandem axle drive train. For a differential mode for the torque transfer assembly, torque from the power input shaft is transmittable to the first and second axles, the first portion is displaceable to non-rotatably connect to the second portion, the fifth portion is displaceable to non-rotatably connect to the sixth portion, and, the third portion is rotatable with respect to the first portion. For an overdrive mode for the torque transfer assembly, the first portion is displaceable to non-rotatably connect to the third portion, and, the input power shaft is rotatable with respect to the first power shaft.

According to aspects illustrated herein, there is provided a method of controlling torque to a tandem axle drive train including a power input shaft arranged to receive torque from an engine, and first and second axles, the method including: engaging a first synchronizer assembly with the power input shaft and a first power shaft; engaging an inter-axle differential gear with a second synchronizer assembly, the first power shaft and a second power shaft, engaging an overdrive gear assembly with the first synchronizer assembly and with the first axle. For a differential mode, the method further comprises creating a first torque path from the power input shaft to the first axle through the first synchronizer assembly, the first power shaft, the inter-axle differential gear, and the second synchronizer assembly, and, creating a second torque path from the power input shaft to the second axle through the first synchronizer assembly, the first power shaft, the inter-axle differential gear, and the second power shaft. For an overdrive mode, the method further comprises creating a third torque path from the power input shaft to the first axle through the first synchronizer assembly and the overdrive gear assembly, and, separating rotation of the input power shaft from rotation of the first power shaft.

BRIEF DESCRIPTION OF THE DRAWINGS

The nature and mode of operation of the present disclosure will now be more fully described in the following detailed description of the disclosure taken with the accompanying figures, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the example embodiments. The assembly of the present disclosure can be driven by any means known in the art, including, but not limited to mechanics, hydraulics, electronics, and/or pneumatics. Similarly, shifting between the connected and disconnected modes can be by any means known in the art, including, but not limited to mechanical, hydraulic, electric, or pneumatic actuation. Furthermore, it should be understood that the gears of the present disclosure could include dog teeth and/or helical gears however, the gears could include any suitable alternative components. The bearing support arrangements can be any suitable arrangement known in the art; the present disclosure should be not construed as being limited to the bearing support arrangements illustrated.

Figure 1A:
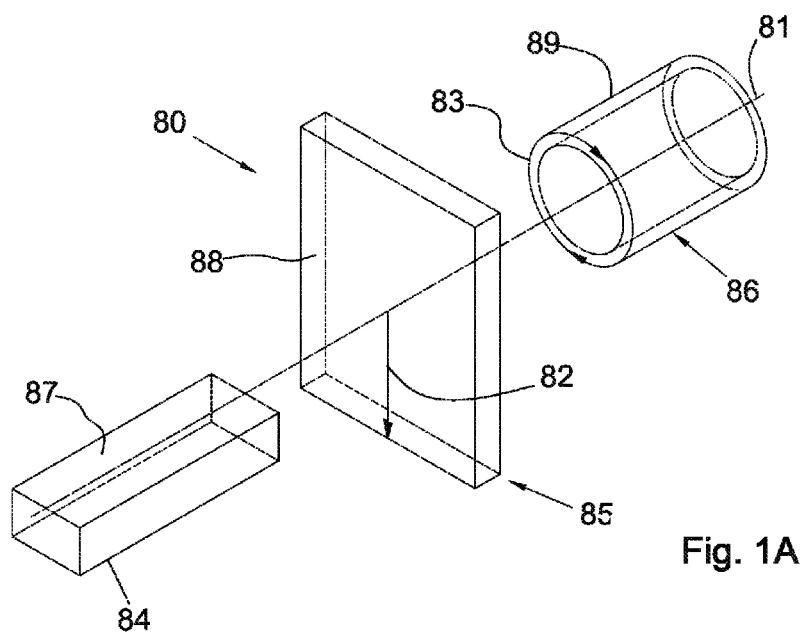
FIG. 1A is a perspective view of a cylindrical coordinate system demonstrating spatial terminology used in the present application.

FIG. 1A is a perspective view of cylindrical coordinate system 80 demonstrating spatial terminology used in the present disclosure. This disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" refer to the orientation parallel to their respective planes. To clarify the disposition of the various planes, objects 84, 85, and 86 are used. Surface 87 of object 84 forms an axial plane. That is, axis 81 forms a line along surface 87. Surface 88 of object 85 forms a radial plane. That is, radius 82 forms a line along surface 88. Surface 89 of object 86 forms a circumferential plane. That is, circumference 83 forms a line along surface 89. As a further example, axial movement or disposition is parallel to axis 81, radial movement or disposition is parallel to radius 82, and circumferential movement or disposition is parallel to circumference 83. Rotation is with respect to axis 81. The adverbs "axially," "radially," and "circumferentially" are with respect to an orientation parallel to axis 81, radius 82, or circumference 83, respectively. The adverbs "axially," "radially," and "circumferentially" refer to an orientation parallel to their respective planes.

Figure 1B:
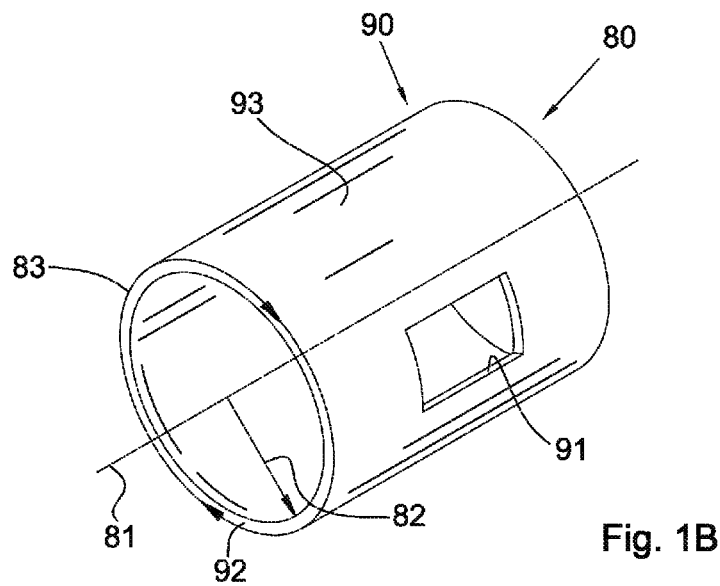
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit this disclosure in any manner. Object 90 includes axial surface 91, radial surface 92, and circumferential surface 93. Surface 91 is part of an axial plane, surface 92 is part of a radial plane, and surface 93 is a circumferential surface.

Figure 2A:
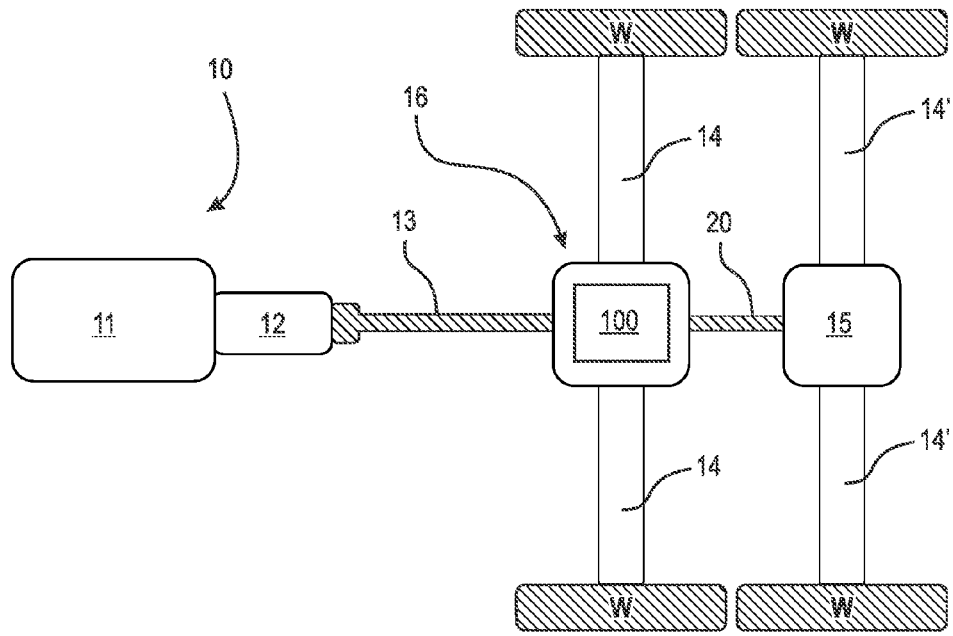
FIG. 2A is a schematic top plan view of a vehicle having a torque transfer assembly in a differential mode.

FIG. 2A is a schematic top plan view of a vehicle having torque transfer assembly 100 in a differential mode.

Figure 2B:
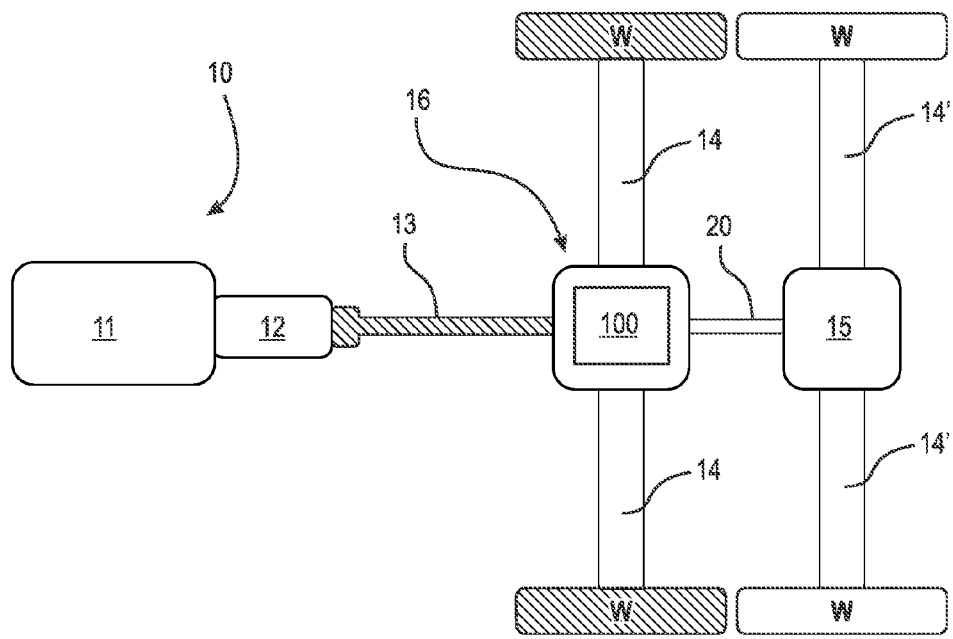
FIG. 2B is a schematic top plan view of a vehicle having a torque transfer assembly in an overdrive mode.

FIG. 2B is a schematic top plan view of a vehicle having torque transfer assembly 100 in an overdrive mode.

Figure 3:
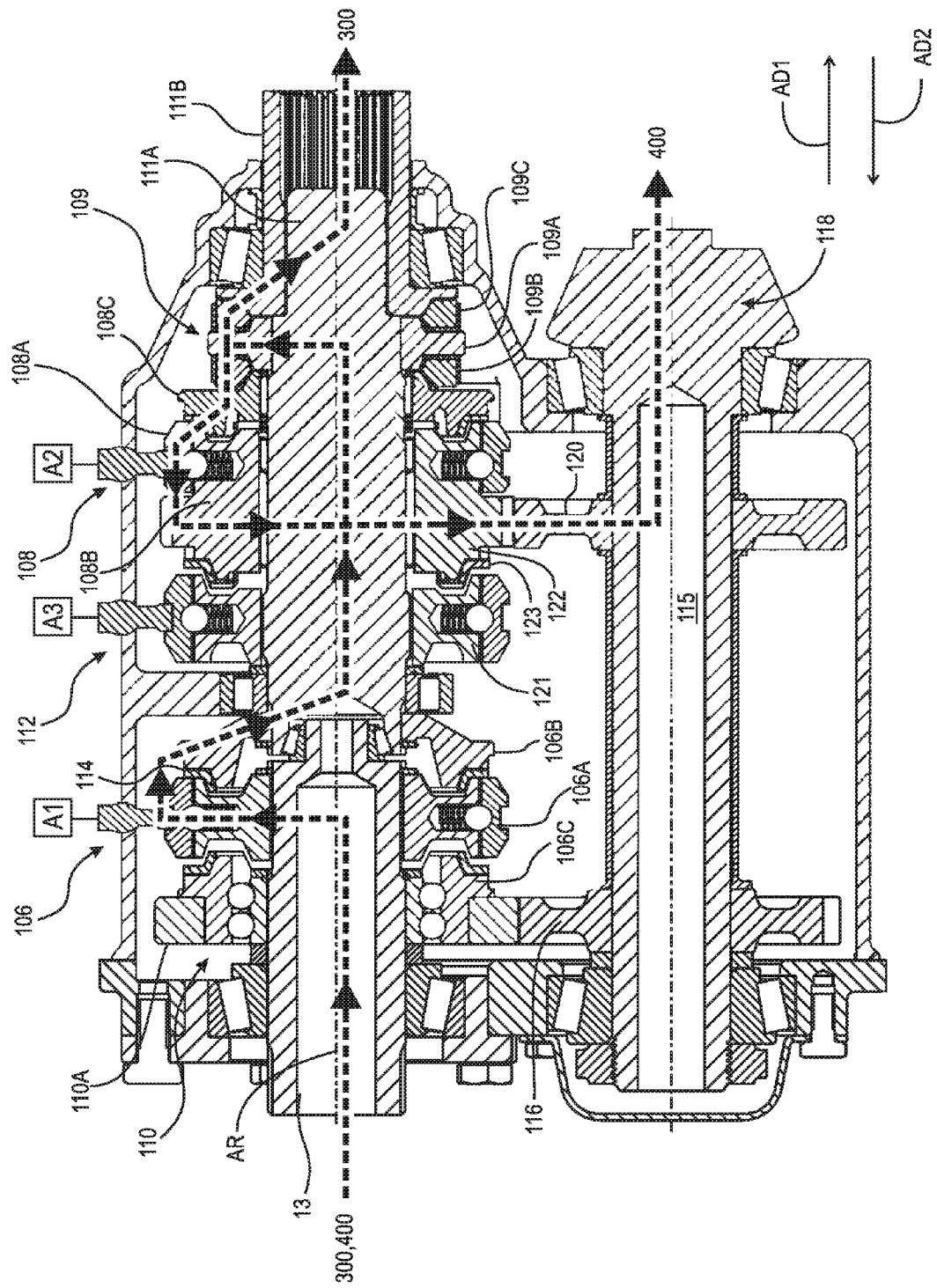
FIG. 3 is a cross-sectional view of the torque transfer assembly shown in FIG. 2A.

FIG. 3 is a cross-sectional view of torque transfer assembly 100 shown in FIG. 2A.

Figure 4:
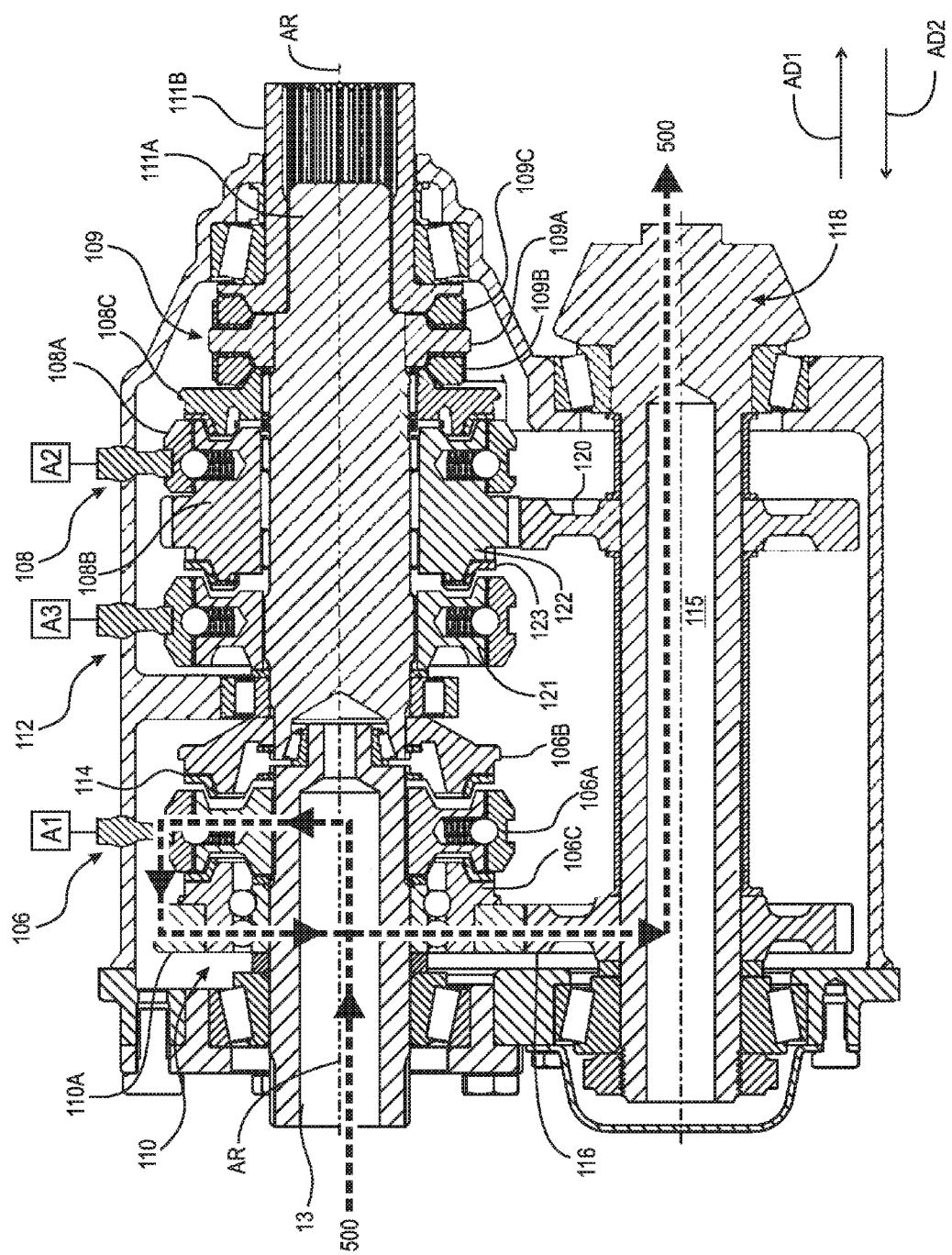
FIG. 4 is a cross-sectional view of the torque transfer assembly shown in FIG. 2B.

FIG. 4 is a cross-sectional view of a portion of torque transfer assembly 100 shown in FIG. 2B. The following should be viewed in light of FIGS. 2A through 4. Torque transfer assembly 100 includes synchronizer assembly 106, synchronizer assembly 108, inter-axle differential gear 109, and overdrive gear assembly 110. Assembly 106 includes portion 106A arranged to non-rotatably connect to power input shaft 13 in tandem axle drive train 10. Input shaft 13 is arranged to receive torque from engine 11 in drive train 10. Overdrive gear assembly 110 is engaged with synchronizer assembly 106 and is arranged to transmit torque to axle 14. Inter-axle differential gear 109 is engaged with power shafts 111A and 111B and is engaged with synchronizer assembly 108. In an example embodiment, assemblies 106 and 108 are co-axial with axis of rotation AR for shafts 13, 111A, and 111B. That is, each of assemblies 106 and 108 rotates about or are rotatable about axis AR. Shaft 111B is arranged to connect to shaft 20.

By one component "engaged with" another component, we mean that rotary motion of the one component is transferred to the other component. In general, the two components are in direct contact; however, it is possible for an ancillary component to be located between the two components. An example of an "engagement" between the two components is the meshing of respective gears for the two components.

In the differential mode of FIGS. 2A and 3 for torque transfer assembly 100, torque paths 300 and 400 are formed. Torque path 300 is formed from power input shaft 13 to axle 14' through synchronizer assembly 106, power shaft 111A, inter-axle differential gear 109, and power shaft 111B. Torque path 400 is formed from power input shaft 13 to axle 14 through synchronizer assembly 106, power shaft 111A, inter-axle differential gear 109, and synchronizer assembly 108. Thus, in the differential mode, the known differential function of inter-axle differential gear 109 is enabled, for example, substantially equal torque is transmitted through torque paths 300 and 400. In an example embodiment, inter-axle differential gear 109 includes gear 109A non-rotatably connected to shaft 111A, gear set 109B, engaged with portion 108C, and gear set 109C engaged with shaft 111B. As is known in the art, gear sets 109B and 109C are independently rotatable with respect to gear 109A, enabling independent rotation of axle 14 (via synchronizer assembly 108) and axle 14' (via shaft 111B).

In the overdrive mode of FIGS. 2B and 4 for torque transfer assembly 100, torque path 500 is formed from input shaft 13 to axle 14 through synchronizer assembly 106 and overdrive gear assembly 110. In overdrive mode, input power shaft 13 is rotatable with respect to power shaft 111A and the entirety of the torque received from engine 11 is transmitted to axle 14. That is, axle 14' is disconnected from shaft 13. Portion 106A is axially displaceable between first and second positions to implement the differential and overdrive modes, respectively, as further described below.

In an example embodiment, synchronizer assembly 106 includes portion 106B arranged non-rotatably connected to power shaft 111A. For the differential mode, portion 106A is axially displaceable to non-rotatably connect to portion 106B. In an example embodiment, synchronizer assembly 106 includes portion 106C and overdrive gear assembly 110 includes gear 110A non-rotatably connected to portion 106C. For the overdrive mode, portion 106A is axially displaceable to non-rotatably connect to portion 106C.

In an example embodiment, synchronizer assembly 108 includes portion 108A non-rotatably connected to portion 108B, and portion 108C engaged with inter-axle differential gear 109. Portion 108B is arranged to engage axle 14. In an example embodiment, for the differential mode, portion 108A is axially displaceable to non-rotatably connect to portion 108C.

In an example embodiment, for the overdrive mode, portion 108A is axially displaceable such that portion 108A is rotatable with respect to portion 108C.

In an example embodiment, inter-axle differential gear 109 includes gear 109A and gear sets 109B and 109C. Gear 109A is non-rotatably connected to power shaft 111A. Gear set 109B is engaged with gear 109A and portion 108C. Gear set 109C is engaged with gear 109A and power shaft 111B. In an example embodiment, torque path 300 includes gear set 109C and torque path 400 includes gear set 109B.

Figure 5:
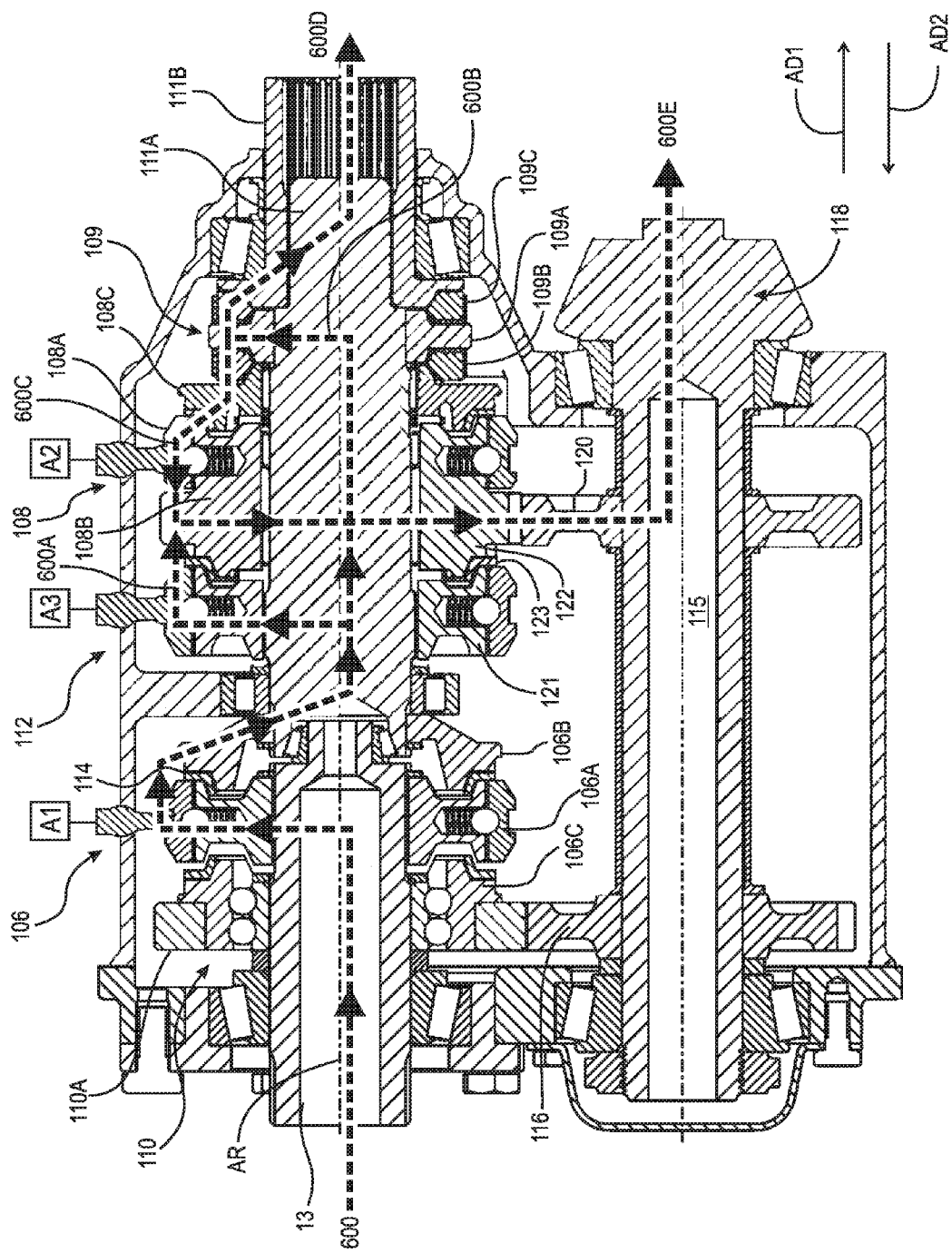
FIG. 5 is a cross-sectional view of the torque transfer assembly shown in FIGS. 2A and 2B in a locked differential mode; and, FIG. 6 is an exploded view of a typical synchronizer assembly.

FIG. 5 is a cross-sectional view of torque transfer assembly 100 shown in FIGS. 2A and 2B showing a locked differential mode. The following should be viewed in light of FIGS. 2A through 5. In an example embodiment, torque transfer assembly 100 includes synchronizer assembly 112 axially displaceable to initiate a differential lock mode for torque transfer assembly 100. In the differential lock mode, rotation of axle 14 is locked to rotation of axle 14', torque paths 600A through 600E are formed, and the differentiating function of inter-axle differential gear 109 is disabled.

In an example embodiment, for the differential lock mode, portion 108B, gear 109A, and shaft 111B are non-rotatably connected. In an example embodiment, for the differential lock mode, portion 106A is axially displaceable to non-rotatably connect to portion 106B to form torque path 600. Torque path 600A is formed from shaft 111A to assembly 112 and portion 108A is axially displaceable to non-rotatably connect to assembly 112 to complete path 600A. Portion 108A is axially displaceable to non-rotatably connect to portion 108B.

For the differential lock mode, torque path 600B extends from shaft 111A to gear 109A and in gear 109, path 600B forks into paths 600C and 600D. Torque path 600E is formed by torque paths 600A and 600C. Shaft 111A, assembly 112, and portions 108A-108C are non-rotatably connected. Then, due to the non-rotatable connection of gear 109A to shaft 111A and portion 108C, gear set 109B, and gear 109A are rotationally locked and the typical differentiating function of inter-axle differential gear 109 is disabled.

In an example embodiment, torque transfer assembly 100 includes pinion shaft 115 with gears 116 and 118. Gear 116 is engaged with gear 110A and gear 118 is arranged to engage a differential gear for axle 14, for example, differential gear 16 described below. Thus, torque path 500 includes shaft 115 and gears 116 and 118. In an example embodiment, shaft 115 includes gear 120 engaged with portion 108B. Thus, torque paths 400 and 600E include pinion shaft 115 and gears 118 and 120.

The following provides further detail regarding torque transfer assembly 100. Any clutch device known in the art capable of achieving synchronization can be used with the present disclosure. Torque transfer assembly 100 can be used in any vehicle known in the art with a tandem axle configuration, such as a truck or bus, with any tandem axle drive train known in the art. For example, engine 11 of drive train 10 is drivingly connected to transmission 12. Power input drive shaft 13 extends longitudinally from transmission 12 to torque transfer assembly 100. Drive train 10 includes front rear axle 14 and rear rear axle 14'. Typically, axles 14 and 14' are arranged substantially transverse to power input drive shaft 13. In the differential and locked differential modes for torque transfer assembly 100, rear wheels W (connected to axles 14 or 14') receive torque and are shown with line hatching in FIG. 2A. To simplify presentation, one wheel is shown at each respective end of axles 14 and 14'; however, it should be understood that any number of wheels known in the art for axles 14 and 14' can be used with torque transfer assembly 100. In the overdrive mode of FIG. 2B, only the wheels for axle 14 receive torque and are hatched accordingly.

It should be understood that torque transfer assembly 100 can be switched among the differential, overdrive, and locked differential modes while drive train 10 is in operation (torque is being transmitted to shaft 13). Further, torque transfer assembly 100 can be switched among the three modes while drive train 10 is operating at any desired speed. In a typical drive train 10, torque is transmitted to axle differential gear 15 for axle 14' by power shaft 20 non-rotatably connected to shaft 111B. Gear 15 can be any gear known in the art. In an example embodiment, torque transfer assembly 100 is interfaced with axle differential gear 16 for axle 14. It should be understood that the interface of torque transfer assembly 100 and gear 16 presented in FIGS. 2A and 2B is schematic and is not intended to represent an actual interface. Gear 16 can be any axle differential gear known in the art. To simplify the presentation, the schematic representations of FIGS. 3 through 6 do not shown gear 16.

In an example embodiment, portion 106A is secured to input power shaft 13 by a spline connection. In an example embodiment, portion 106A is axially displaceable in axial directions AD1 and AD2 by means of actuator A1. Actuator A1 displaces portion 106A in direction AD1 to non-rotatably engage portion 106B, for example, through dog teeth gearing, for the differential and locked differential modes. Actuator A1 displaces portion 106A in direction AD2 to non-rotatably connect to portion 106C for overdrive mode. In the differential and locked differential modes, portion 106A is rotatable with respect to portion 106C and in overdrive mode, portion 106A is rotatable with respect to portion 106B.

Figure 6:
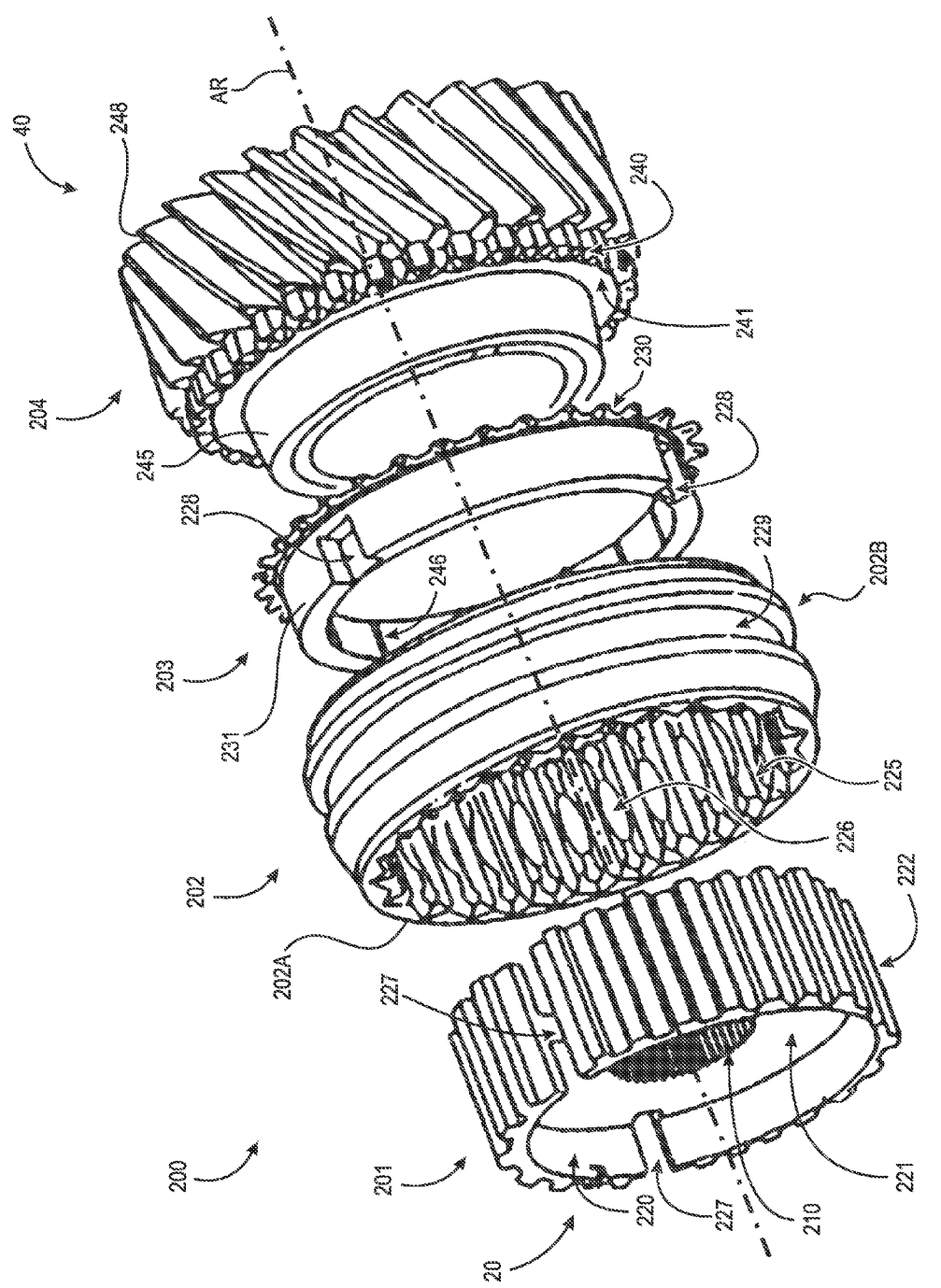

FIG. 6 is an exploded view of typical synchronizer assembly 200. It should be appreciated that the components in FIG. 6 are presented for purposes of exemplary clarification of synchronizer assemblies 106, 108, and 112, and should not be construed as limiting the present disclosure in any way. Typical synchronizer 200 includes hub 201, sleeve 202, blocker ring 203, and ratio gear 204. Hub 201 is non-rotatably fixed by splines 210 with an input power shaft (not shown) running longitudinally through hub 201. Hub 201 has generally a "T" shaped cross-section that is defined by inner web 221 which radially extends from the input power shaft and cylindrical flange 220 which extends longitudinally with the input power shaft and is substantially transverse to inner web 221.

Grooves 227 are arranged in inner web 221 and flange 220 to receive struts (not shown), for example. Grooves 227 are operatively arranged to engage channel 226 in sleeve 202. External splines 222 formed on flange 220 are operatively arranged to engage internal splines 225 arranged on synchronizer sleeve 202. Splines 222 and 225 allow for axial movement of sleeve 202 with respect to hub 201.

Sleeve 202 is operatively arranged for axial movement with external splines 222 on hub 201. Splines 225 are located on inner circumference 202A of sleeve 202. Sleeve 202 must be arranged such that axial movement can occur between hub 201 and blocking ring 203. Channel 229 is constructed on outer circumference 202B of sleeve 202, which allows a switching fork, for example, (not shown) to axially slide sleeve 202 in relation to blocking ring 203. It should be appreciated that the synchronizers of the present disclosure can achieve shifting by any means known in the art including but not limited to shift forks or change levers. Splines 225 are substantially similar to splines 222; splines 222 are meshingly engageable with splines 225.

Grooves 227 can be engaged by struts, for example, (not shown) or by ball and spring assemblies. The struts or ball and spring assemblies control the locking of typical synchronizer 200. Grooves 228 in blocker ring 203 are arranged to engage with grooves 227 of hub 201. Blocker ring 203 includes radial flange section 231 having external splines 230 which are aligned with external splines 240, or dog teeth, located on the radial flange section 241 of ratio gear 204. Both external splines 230 and 240 are designed to mesh with internal splines 225 of sleeve 202. Conical surface 245 is engageable with internal circumference 246 of blocker ring 203 to maximize surface area. Conical surface 245 preferably has a suitable friction lining covering. This increase in surface area and friction allows for less slip from blocker ring 203 when splines 230 and 240 are engaged with sleeve 202. Splines 230, 240, 222, and 225 are made of the same gearing to ensure proper axial sliding; any suitable gearing can be used.

Ratio gear 204 comprises helical gear 248, conical surface 245, radial flange 241, and external splines 240. Ratio gear 204 is one integral unit comprising two parts fixed together in any suitable manner, for example, welding. Helical gear 248 is one part and conical surface 245, radial flange 241, and external splines 240 form the other part.

Using the exemplary synchronizer 200 shown in FIG. 6 for clarification, portion 106A, of assembly 106, is similar to hub 201 and sleeve 202, portions 106B and 106C are similar to gear 204. Portion 114 arranged between portions 106A and 106B is similar to blocker ring 204. Portion 106A actuated by actuator A1 is similar to sleeve 202 shown in FIG. 6. Similarly, in relation to synchronizer 200 shown in FIG. 6, portion 108A, of assembly 108, is similar to hub 201, portions 108B and 108C are similar to gear 204, and portion 114A arranged between portions 108A and 108C is similar to blocker ring 204. Portion 108A actuated by actuator A2 is similar to sleeve 202. As for assembly 112 in relation to synchronizer 200, portion 121 is similar to hub 201, portion 122 is similar to gear 204, and portion 123 is similar to blocker ring 204. Portion 121 actuated by actuator A3 is similar to hub 201.

Further along torque path 300, torque is transmitted to inter-axle differential gear 109. Inter-axle differential gear 109 evenly distributes torque between torque path 300 and torque path 400. In the differential mode, gears sets 109B and 109C are independently rotatable with respect to gear 109A. In an example embodiment, gear sets 109B and 109C include respective bevel and side gears.

In an example embodiment, portion 108A is axially displaceable in axial directions AD1 and AD2 by means of actuator A2. Actuator A2 displaces portion 108A in direction AD1 to non-rotatably engage portion 108C, for example, through dog teeth gearing, for the differential and locked differential modes. In an example embodiment, actuator A2 displaces portion 108A in direction AD1 to disengage from portion 108B for overdrive mode. In the differential and locked differential modes, portions 108A-C are non-rotatably connected and portion 108B is rotatable with respect to assembly 112.

In overdrive mode, synchronizer assembly 108, inter-axle differential gear 109, and synchronizer assembly 112 are isolated from torque on shaft 13 and rotate freely to prevent gear grinding. Also, inter-axle differential gear 109 is operatively arranged to enable axle 14' to spin freely and at a different angular velocity than input power shaft 13 due to the wheels being pulled along the ground and not being under power. Advantageously, in overdrive mode, significant power loss from moving parts (downstream of torque transfer assembly 100) can be avoided.

In an example embodiment, torque transfer assembly 100 includes a lift movable in the vertical direction that raises axle 14' and locks axle 14' from rotating; this avoids churning loss.

In the differential mode, torque transfer assembly 100 transmits substantially equal torque along paths 300 and 400, while enabling different respective rotation speeds for axles 14 and 14' depending on driving conditions. In contrast, in the differential lock mode, rear axles 14 and 14' rotate at substantially the same speed, but inter-axle differential gear 109 does not necessarily transmit substantially equal torque to rear axles 14 and 14' (paths 600E and 600D, respectively) because the differentiating function of inter-axle differential gear 109 is disabled. However, depending on driving conditions, it is possible for rear axles 14 and 14' to rotate at equal speeds and distribute equal torque. Advantageously, operating in the locked differential mode can increase fuel efficiency for certain driving conditions, for example, high speed driving with nominal turning such as on an interstate highway. It should be appreciated that the overdrive mode similarly increases fuel efficiency in certain driving conditions, for example, high speed driving. The overdrive mode can be configured to operate at any speed.

It will be appreciated that various aspects of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque transfer assembly for a tandem axle drive train having a first axle, a second axle, and a power input shaft arranged to receive torque from an engine, comprising:
   a first synchronizer assembly including a first portion arranged to non-rotatably connect to the power input shaft;
   a second synchronizer assembly having a second portion and a third portion;
   an overdrive gear assembly; and, an inter-axle differential gear:
  connected with first and second power shafts; and,
  connected with said second portion of said second synchronizer assembly;
wherein:
  in a differential mode for said torque transfer assembly:
    a first torque path is formed from said power input shaft to the first axle through said first synchronizer assembly, said first power shaft, said inter-axle differential gear, and said second power shaft; and,
    a second torque path is formed from said power input shaft to the second axle through said first synchronizer assembly, said first power shaft, said inter-axle differential gear, and said second synchronizer assembly; and,
  in an overdrive mode for said torque transfer assembly, a third torque path is formed from said power input shaft to said first axle through said first synchronizer assembly and said overdrive gear assembly and said third portion of said second synchronizer assembly is rotatable relative to said first and second power shafts.

2. The torque transfer assembly of claim 1, wherein said first portion is axially displaceable between first and second positions in said differential and overdrive modes, respectively.

3. The torque transfer assembly of claim 1, wherein in said overdrive mode, said input power shaft is rotatable with respect to said first power shaft.

4. The torque transfer assembly of claim 3, wherein in said overdrive mode, an entirety of the torque received from the engine is transmitted through said third torque path.

5. The torque transfer assembly of claim 1, wherein:
  said first synchronizer assembly includes a second portion non-rotatably connected to said first power shaft; and,
  in said differential mode, said first portion is axially displaceable to non-rotatably connect to said second portion.

6. The torque transfer assembly of claim 1, wherein:
  said first synchronizer assembly includes a second portion;
  said overdrive gear assembly includes a first gear non-rotatably connected to said second portion; and,
  in said overdrive mode, said first portion is axially displaceable to non-rotatably connect to said second portion.

7. The torque transfer assembly of claim 6, further comprising:
  a pinion shaft including:
    a second gear engaged with the first gear; and,
    a third gear arranged to engage a differential gear for said second axle, wherein:
  the pinion shaft and the first, second, and third gears are included in the third torque path.

8. The torque transfer assembly of claim 1, wherein:
said second synchronizer assembly includes:
  a second portion non-rotatably connected to a third portion; and,
  a fourth portion connected with said inter-axle differential gear; and,
  said third portion is included in said second torque path.

9. The torque transfer assembly of claim 8, further comprising:
  a pinion shaft engaged with the third portion and including a gear arranged to engage a differential gear for said second axle, wherein:
  the third portion and the pinion shaft are included in the second torque path.

10. The torque transfer assembly of claim 8, wherein
for said differential mode, said second portion of said second synchronizer assembly is axially displaceable to non-rotatably connect to said fourth portion; or,
in said overdrive mode, said second portion is axially displaceable such that said second portion is rotatable with respect to said fourth portion.

11. The torque transfer assembly of claim 8, wherein:
said inter-axle differential gear includes:
  a first gear non-rotatably connected to said first power shaft;
  a second gear connected with said first gear and said fourth portion; and,
  a third gear connected with said first gear and said second power shaft;
said first torque path includes said third gear; and,
said second torque path includes said second gear.

12. The torque transfer assembly of claim 1, further comprising:
  a third synchronizer assembly axially displaceable to initiate a differential lock mode for said torque transfer assembly, wherein,
  in said differential lock mode, rotation of said first axle is locked to rotation of said second axle.

13. The torque transfer assembly of claim 12, wherein:
said second synchronizer assembly includes a second portion included in said second torque path;
said inter-axle differential gear includes a first gear non-rotatably connected to said first power shaft; and,
in said differential lock mode, said second portion, said first gear, and said second power shaft are non-rotatably connected.

14. The torque transfer assembly of claim 13, wherein:
said first synchronizer assembly includes a third portion non-rotatably connected to said first power shaft;
said second synchronizer assembly includes:
  a fourth portion non-rotatably connected to said second portion; and,
  a fifth portion engaged with said inter-axle differential gear;
said third synchronizer assembly is non-rotatably connected to said first power shaft; and, for said differential lock mode:
  said first portion is axially displaceable to non-rotatably connect to said third portion;
  said fourth portion is axially displaceable to non-rotatably connect to said fifth portion; and,
  said third synchronizer assembly is axially displaceable to non-rotatably connect to said second portion.

15. A torque transfer assembly for a tandem axle drive train having a power input shaft arranged to receive torque from an engine, a first axle, and a second axle, comprising:
  a first synchronizer assembly including:
    a first portion arranged to non-rotatably connect to the power input shaft and arranged to receive torque from the engine;
    a second portion non-rotatably connected to a first power shaft; and,
    a third portion;
  a second synchronizer assembly including:
    a fourth portion arranged to transmit torque to the first axle;
    a fifth portion non-rotatably connected to the fourth portion; and,
    a sixth portion;
  an overdrive gear assembly engagable with said third portion; and,
  an inter-axle differential gear:
    including a first gear non-rotatably connected to said first power shaft;

connected with said sixth portion; and, connected with a second power shaft, said second power shaft arranged to transmit torque to a second axle for said tandem axle drive train, wherein:

for a differential mode for said torque transfer assembly:

torque from said power input shaft is transmittable to said first and second axles;

said first portion is displaceable to non-rotatably connect to said second portion;

said fifth portion is displaceable to non-rotatably connect to said sixth portion; and, said third portion is rotatable with respect to said first portion; and, for an overdrive mode for said torque transfer assembly:

said first portion is displaceable to non-rotatably connect to said third portion;

said fourth portion is axially displaceable such that said fourth portion is rotatable with respect to said sixth portion; and, said input power shaft is rotatable with respect to said first power shaft.

16. The torque transfer assembly of claim 15, wherein:

in said differential mode for said torque transfer assembly:

a first torque path is formed from said power input shaft to said first axle through said first and second portions, said first power shaft, said inter-axle differential gear, and said second synchronizer assembly; and, a second torque path is formed from said power input shaft to said second axle through said first and second portions, said first power shaft, said inter-axle differential gear, and said second power shaft; and, in said overdrive mode for said torque transfer assembly, a third torque path is formed from said power input shaft to said first axle through said first and third portions and said overdrive gear assembly.

17. The torque transfer assembly of claim 15, further comprising:

a third synchronizer assembly non-rotatably connected to said first power shaft and axially displaceable to non-rotatably connect to said fourth portion to initiate a differential lock mode for said torque transfer assembly, wherein, in said differential lock mode, rotation of said first axle is locked to rotation of said second axle.

18. A torque transfer assembly for a tandem axle drive train having a power input shaft arranged to receive torque from an engine and first and second axles, comprising:

a first synchronizer assembly engaged with the power input and arranged to receive torque from the engine;

a second synchronizer assembly having first and second portions; and, an inter-axle differential gear:

connected with first and second power shafts; and, connected with said first portion of said second synchronizer assembly, wherein:

first and second torque paths are formed in a differential mode for said torque transfer assembly; and, in an overdrive mode for said torque transfer assembly:

a third torque path is formed from said power input shaft to said first axle through said first synchronizer assembly;

said second portion of said second synchronizer assembly is rotatable relative to said first and second power shafts; and, an entirety of the torque from the input power shaft is transmitted through the third torque path.

\* \* \* \* \*